2,859,236
PROCESS FOR THE PRODUCTION OF ISOTHIOCYANATES

Erich Schmidt, Munich, Germany, Franz Zaller, deceased, late of Munich, Germany, by Ernestine Zaller, administratrix, Erich Kammerl and Dietrich Ross, Munich, and Robert Schnegg, Dormagen, Germany, assignors to Farbenfabriken Bayer Aktiengesellschaft, Leverkusen, Germany, a corporation of Germany No Drawing. Application May 17, 1955
Serial No. 509,123

Claims priority, application Germany May 19, 1954

7 Claims. (Cl. 260—454)

Isothiocyanates have the general formula RNCS, wherein R can be an aliphatic, hydroaromatic, aromatic or aromatic-aliphatic radical. The radical designated by R may be substituted by other atoms or atom groups.

According to the hitherto known methods aliphatic isothiocyanates may be produced by rearrangement of thiocyanates of the formula $RSC \equiv N$, or from N-monosubstituted alkyl dithio-carbamates of the formula

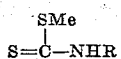

by treatment with salts of heavy metals. Another synthesis of isothiocyanates employs the reaction of thiophosgene with amines.

Aromatic isothiocyanates may also be produced from thiocarbanilides by reaction with, for instance, concentrated hydrochloric acid. Another method starts from the isonitriles, from which isothiocyanates can be obtained by addition of sulfur.

All these known processes have considerable disadvantages which consist either in the difficulty of preparing the starting materials or in the poor yields of the reaction so the isothiocyanates have hitherto not been employed in chemical technology, although they may be of considerable importance for pharmacological purposes owing to their physiological properties and for the production of plastics, dyestuffs or intermediates owing to the high reactivity of their cumulated double bonds.

In copending application Serial No. 480,064, filed January 5, 1955, by E. Schmidt et al., it has been proposed to produce organic isothiocyanates by contacting a salt of an N-monosubstituted dithiocarbamic acid in an organic solvent with an aqueous alkaline solution of an alkali metal hypohalite. The process described in the copending application constitutes a distinct advance over the known processes of producing isothiocyanates, since it provides a possibility of producing the same continuously on a commercial scale with exceptionally good yields.

The use of hypohalites, however, presents some disadvantages which are overcome by the process of the present invention.

It is therefore an object of the present invention to provide a simple process for the production of organic isothiocyanates;

A further object is to provide a process which starts from readily accessible starting materials;

Another object is the provision of a process which has high yields of the desired organic isothiocyanates, thus rendering the isothiocyanates available for commercial purposes;

Further objects will become apparent as the following specification proceeds.

Our new process consists in contacting a salt of an N-monosubstituted dithiocarbamic acid of the formula

wherein R is an organic radical and Me stands for an alkali metal or the ammonium ion, with an alkali metal chlorite in an aqueous medium. With sodium chlorite, as the alkali metal, the reaction proceeds according to the following formula:

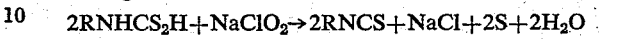

Preferably the reaction is carried out by dissolving or suspending the dithiocarbamates in water in the presence of an organic solvent, preferably a chlorinated hydrocarbon such as methylene chloride or carbon tetrachloride and introducing an aqueous solution of sodium chlorite slowly and with stirring at room temperature. During the reaction the temperature should not rise above 20–25° C., preferably, the reaction is carried out within a temperature range of $-10°$ to $+25°$ C.

The organic isothiocyanate formed dissolves in the organic solvent and is separated from the aqueous phase. Thereupon the organic solvent may be removed by evaporation and the residual isothiocyanate may be purified by distillation or crystallization.

It is a remarkable feature of the present invention that the yields of the isothiocyanates are improved and that the theoretical yields are nearly attained.

The isothiocyanates obtained according to the present invention are already pure so that a second purification is unnecessary for most commercial purposes.

Since the reaction of the dithiocarbamates with alkali metal chlorites proceeds very quickly and in good yields the process is especially adapted for the continuous production of isothiocyanates.

The use of sodium chlorite has the advantage that the sulfur is not oxidized to sodium sulfite or sodium sulfate as in the process of the copending application Serial No. 480,064, but is separated in elementary form from the aqueous phase. It can be recovered therefrom by filtration. The present process can be carried out to yield isothiocyanates in which the radical R contains groups sensitive to hypohalites. Examples of such groups are phenolic hydroxyl groups or carboxylic acid amide groups.

Example 1

1 mol of n-butylamine is dropped with cooling into a suspension of 1.1 mol of carbon disulfide and 2.2 mols of 25% aqueous ammonia. Thereafter the mixture is stirred for a further four hours and then stored for 12 hours at room temperature. The reaction mixture, containing the ammonium salt of n-butyl-dithiocarbamic acid, is poured with 1 liter of water into a wide necked flask of 4 liters contents and 600 cc. of methylene chloride is added with stirring.

The suspension is cooled with ice-water to about 18° C. 300 cc. of an aqueous sodium chlorite solution, containing 124.3 g. (1.1 mol) of commercial sodium chlorite, are added so slowly, that the temperature of the reaction mixture does not exceed $+25°$ C. The suspension, whose temperature comes gradually down to about 20° C. is stirred for a further 4 hours. The chlorite is then almost used up. The sulfur formed separates in solid form and is filtered by suction. The methylene chloride layer is then separated from the aqueous layer in the separating funnel. The aqueous layer is once more shaken with 110 cc. of methylene chloride and the combined methylene chloride solutions are washed with 200 cc. of water.

The methylene chloride solutions are dried over anhydrous magnesium sulfate. After separation of the solid magnesium sulfate the methylene chloride is distilled off over a short Widmer-spiral. Finally, the Widmer-spiral is removed and the n-butylisothiocyanate is completely distilled into an ice-cooled receiver. 105.3 g. of n-butyl-isothiocyanate (=91.5% of the theoretical are obtained).

In the same manner, 176 g. (=87% of the theoretical) of isopropyl-isothiocyanate are obtained from 118.2 g. (2 mols) of isopropylamine; 209 g. (=90% of the theoretical) of n-butyl-isothiocyanate are obtained from 146.3 g. (2 mols) of n-butylamine; 268.5 g. (=95% of the theoretical) of cyclohexyl-isothiocyanate are obtained from 198.2 g. (2 mols) of cyclohexylamine.

*Example 2*

For obtaining aromatic dithiocarbamates 1 mol of the aromatic amine is reacted with 1.05 mol of carbon disulfide and 1.1 mol of aqueous ammonia of 25% strength. The mixture is diluted with water. (If an excess of ammonia is employed, the dithiocarbamate yields large amounts of the corresponding monosubstituted thiocarbamide apart from the corresponding isothiocyanate upon being contacted with the chlorite.) The dithiocarbamate is poured into a wide necked flask having at least 5 liters capacity together with 2 liters of water and the procedure described in Example 1 is followed.

Thus, 124.2 g. (=92% of the theoretical) of phenyl-isothiocyanate are obtained from 93.1 g. (1 mol) of aniline; 152.7 g. (=93% of the theoretical) of 2- or 4- methoxy-phenyl-isothiocyanate are obtained from 123 g. (1 mol) of o- or p-anisidine; 174 g. (=90% of the theoretical) of methyl-benzoate-2-isothiocyanate are obtained from 151 g. (1 mol) of 2-amino-methyl-benzoate; 127.2 g. (=77% of the theoretical) of 3-methoxy-phenyl-isothiocyanate are obtained from 123.1 (1 mol) of m-anisidine.

*Example 3*

1 mol of 1-diethylamino-propane-dithiocarbamate (obtained according to Liebig's Annalen der Chemie, 585, 231 d, 1954) are poured together with the cooled solution of 106 g. (1 mol) of anhydrous sodium carbonate in 1 liter of water into a wide necked flask of a capacity of 5 liters. After the addition of 600 cc. of methylene chloride 112.5 g. of 80% commercial sodium chlorite (1 mol) are added and the reaction mixture worked up as in Example 1.

From 130 g. (1 mol) of 1-amino-3-diethylamino-propane there are obtained 142 g. (82.4% of the theoretical) of 3-diethylamino-propane-isothiocyanate-(1), which is distilled at a pressure of 0.5–2 mm. Upon redistillation the nearly colorless compound distills at 109–110° C. at a pressure of 10 mm.

*Example 4*

136.2 g. (1 mol) of freshly distilled p-amino-dimethyl-aniline is added to 79.9 g. (1.05 mol) of carbon disulfide and 82.6 cc. of 25% aqueous ammonia (1.1 mol) and diluted with 100 cc. of water. The reaction mixture forms a slurry and another 150 cc. of water are added. Thereupon 112.5 g. of commercial sodium chlorite are added and 600 cc. of methylene chloride introduced in a wide necked flask as in Example 1. The further working up is carried out as in Example 1. When the methylene chloride has been distilled off, solid 4-dimethylamino-phenyl-isothiocyanate is obtained, which is shaken with 250 cc. of acetone in order to remove the sulfur. After a few hours the turbid solution is decanted from the undissolved residue. The solvent is distilled off and the residue powdered. It is then extracted again in a Soxlet extractor with petroleum ether (boiling point 30–50° C.) in order to separate it from sulfur. The yield amounts to 170 g. (95.4% of the theoretical) of 4-dimethylamino-phenyl-isothiocyanate. From the cooled solution of 50 g. of this substance in 150 cc. of hot methanol, 46.8 g. (93.6% of the theoretical) of the nearly colorless isothiocyanate crystallize. The melting point is 69–70° C.

In an analogous manner 3-hydroxyphenyl-isothiocyanate is obtained, in yields of about 75% of the theoretical, from the ammonium salt of 3-hydroxyphenyl-dithiocarbamic acid and sodium chlorite; and 3-diethylamino-propane-isothiocyanate is obtained from the ammonium salt of 3-diethyl-amino-propane-dithiocarbamic acid and sodium chlorite.

We claim:

1. A process of producing an organic isothiocyanate which comprises reacting a dithiocarbamate of the formula

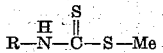

wherein Me is selected from the group consisting of an alkali metal and the ammonium ion, and R is a radical selected from the group consisting of lower alkyl, dialkylaminoalkyl, cyclohexyl, phenyl, hydroxyphenyl, alkoxyphenyl, carbalkoxyphenyl, and dialkylaminophenyl, in an organic solvent with an aqueous solution of an alkali metal chlorite at a temperature up to about 25° C.

2. A process of producing an organic isothiocyanate which comprises slowly introducing an aqueous alkali metal chlorite solution into a methylene chloride solution of a dithiocarbamate of the formula

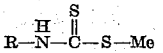

wherein Me is selected from the group consisting of an alkali metal and the ammonium ion, and R is a radical selected from the group consisting of lower alkyl, dialkylaminoalkyl, cyclohexyl, phenyl, hydroxyphenyl, alkoxyphenyl, carbalkoxyphenyl and dialkylaminophenyl, at a temperature between —10° C. and 25° C., separating the methylene chloride phase, evaporating the methylene chloride, and recovering the organic isothiocyanate formed.

3. Process of claim 2 wherein the dithiocarbamate is the ammonium salt of N-butyl-dithiocarbamic acid.

4. Process of claim 2 wherein the dithiocarbamate is the ammonium salt of N-cyclohexyl-dithiocarbamic acid.

5. Process of claim 2 wherein the dithiocarbamate is the ammonium salt of N-phenyldithiocarbamic acid.

6. Process of claim 2 wherein the dithiocarbamate is the ammonium salt of 4-dimethylaminophenyl-dithiocarbamic acid.

7. Process of claim 2 wherein the dithiocarbamate is the ammonium salt of 3-diethylaminopropane-dithiocarbamic acid.

References Cited in the file of this patent

UNITED STATES PATENTS 2,595,723 Spiegelberg et al.  May 6, 1952

FOREIGN PATENTS 105,245 Australia  Sept. 20, 1938

OTHER REFERENCES

Beilstein (vol. 4, p. 158), 1922.

Degering: "An Outline of Organic Nitrogen Compounds" (1945), p. 547.